(12) United States Patent
Feldmeier et al.

(10) Patent No.: US 7,444,743 B2
(45) Date of Patent: Nov. 4, 2008

(54) CONNECTING DEVICE FOR CONNECTING ELECTRICAL FOIL CONDUCTORS

(75) Inventors: Günter Feldmeier, Lorsch (DE); Andreas Woeber, Kronau (DE); Heinz Scherer, Bensheim (DE); Daniel Reitmayer, Reichelsheim (DE)

(73) Assignee: Tyco Electronics AMP GmbH, Bensheim (DE)

( * ) Notice: Subject to any disclaimer, the term of this patent is extended or adjusted under 35 U.S.C. 154(b) by 128 days.

(21) Appl. No.: 11/419,788

(22) Filed: May 23, 2006

(65) Prior Publication Data

US 2006/0283628 A1 Dec. 21, 2006

(30) Foreign Application Priority Data

Jun. 3, 2005 (DE) .................. 10 2005 025 632

(51) Int. Cl.
*B23P 19/00* (2006.01)
*H05K 7/20* (2006.01)

(52) U.S. Cl. ..................... 29/748; 29/857; 361/641; 439/76.2

(58) Field of Classification Search ............. 29/745, 29/748, 749, 757, 761, 876, 881, 882, 854; 439/67, 98, 99; 361/752, 710, 704, 641; 174/50, 84 C See application file for complete search history.

(56) References Cited

U.S. PATENT DOCUMENTS

| 4,203,646 A | | 5/1980 | Desso et al. | |
|---|---|---|---|---|
| 4,557,048 A | * | 12/1985 | Cordeiro | ............... 29/863 |
| 4,790,777 A | * | 12/1988 | Iimori et al. | ............... 439/744 |
| 4,971,567 A | * | 11/1990 | Mizuno et al. | ............... 439/98 |
| 5,123,853 A | * | 6/1992 | Gilbert et al. | ............... 439/98 |
| 5,434,749 A | * | 7/1995 | Nakayama | ............... 361/775 |
| 5,453,026 A | * | 9/1995 | Ikegami | ............... 439/579 |
| 5,478,244 A | * | 12/1995 | Maue et al. | ............... 439/76.2 |
| 5,893,775 A | * | 4/1999 | Annokkee et al. | ............... 439/495 |
| 5,961,740 A | * | 10/1999 | Wambach et al. | ............... 136/251 |
| 6,403,880 B1 | * | 6/2002 | Elford et al. | ............... 174/51 |
| 6,582,249 B1 | * | 6/2003 | Boeck et al. | ............... 439/492 |
| 7,134,883 B2 | * | 11/2006 | Werner et al. | ............... 439/76.1 |
| 2005/0054219 A1 | * | 3/2005 | Werner et al. | ............... 439/76.1 |
| 2005/0054244 A1 | * | 3/2005 | Werner et al. | ............... 439/682 |
| 2006/0283628 A1 | * | 12/2006 | Feldmeier et al. | ............... 174/260 |

FOREIGN PATENT DOCUMENTS

| DE | 10 2004 001011 A1 | 9/2004 |
|---|---|---|
| DE | 10 2004 010 658 A1 | 1/2005 |
| EP | 0 999 601 A1 | 5/2000 |
| EP | 1 487 064 A1 | 12/2004 |
| WO | 03/041227 A | 5/2003 |

OTHER PUBLICATIONS

European Search Report dated Oct. 12, 2007 for Application No. EP 06 00 9441.

* cited by examiner

*Primary Examiner*—Minh Trinh
(74) *Attorney, Agent, or Firm*—Barley Snyder LLC

(57) ABSTRACT

A connecting device that connects at least one foil conductor to at least one connection line comprises an insulative connector housing having a pressed screen arranged in an interior thereof. The pressed screen electrically connects the foil conductor to the connection line. A first clamping spring configured for resilient attachment to a first connection web extending from the pressed screen. The first clamping spring fixes the foil conductor to the first connection web in an electrically conductive manner.

17 Claims, 5 Drawing Sheets

CONNECTING DEVICE FOR CONNECTING ELECTRICAL FOIL CONDUCTORS

FIELD OF THE INVENTION

The invention relates to a connecting device for connecting at least one electrical foil conductor to at least one connection line. A connecting device of this type is intended, in particular, for electrically connecting solar cells of a solar module.

BACKGROUND OF THE INVENTION

A connecting device in the form of a terminal box for electrically connecting a solar module is known from DE 10 2004 010658 AI. The terminal box comprises a housing having a base. A connecting arrangement that forms a circuit is attached to the base of the housing. The connecting arrangement has a first side provided with clamping members. Output lines are guided out of a second side of the connecting arrangement. A diode is attached to the circuit. After the connecting arrangement is introduced into the terminal box, the terminal box is filled with filler. A cover is then provided on the housing to close the terminal box.

In conventional solar cell modules, a back surface of the solar cells, which is remote from a solar irradiation side of the solar module, is contacted using connection foils, which are connected using a connecting device, in the form of the terminal box, to connection lines, also known as solar lines. This connection is conventionally produced by soldering, screwing or using a clamp acting on one side of a conductor rail and the connection foil applied thereto.

As a result of the growing market for solar modules, the demand for terminal boxes that may be used for such modules has increased such that terminal boxes have become a typical mass-produced product. It is therefore desirable to make both the components and the methods for producing connecting devices in the form of terminal boxes as simple and cost-effective as possible, while maintaining high-quality, reliable connections.

BRIEF SUMMARY OF THE INVENTION

The invention therefore provides a connecting device that connects at least one foil conductor to at least one connection line comprising an insulative connector housing having a pressed screen arranged in an interior thereof. The pressed screen electrically connects the foil conductor to the connection line. A first clamping spring configured for resilient attachment to a first connection web extending from the pressed screen. The first clamping spring fixes the foil conductor to the first connection web in an electrically conductive manner.

The invention further provides a connecting device for electrically connecting solar cells of a solar module comprising an insulative connector housing having a pressed screen arranged in an interior thereof. The pressed screen has a first pressed screen member electrically isolated from a second pressed screen member. Each of the first and second pressed screen members electrically connects a foil conductor to a connection line. At least the first pressed screen member having a first clamping spring configured for resilient attachment to a first connection web extending from the first pressed screen member. The first clamping spring fixes the foil conductor of the first pressed screen member to the first connection web in an electrically conductive manner.

DETAILED DESCRIPTION OF THE INVENTION

Figure 1:
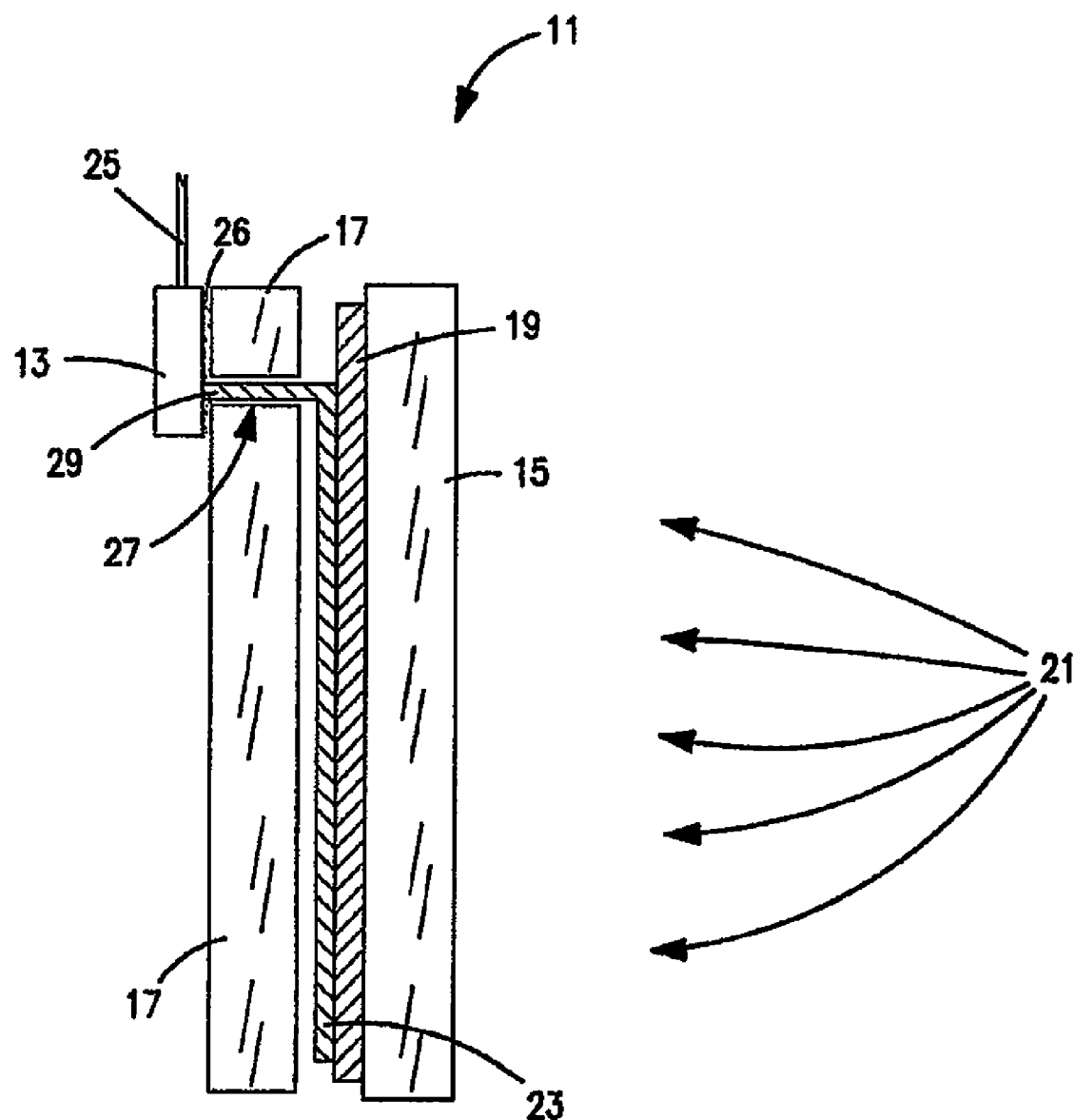
FIG. 1 is a schematic side view of a solar module provided with a connecting device according to the invention.

FIG. 1 shows a solar module 11 provided with a connecting device 13 according to the invention. The solar module 11 comprises a solar irradiation-side cover sheet 15 and an irradiation shadow-side protective sheet 17. The cover sheet 15 may be formed, for example, from a substantially transparent material, such as glass. The protective sheet 17 may be formed, for example, from glass or a protective film. The protective sheet 17 is provided with one or more through-holes 27 through which one or more foil conductors 29 may be guided away from a back surface of the cover sheet 15 toward the connecting device 13. At least one solar cell 19 is located between the cover sheet 15 and the protective sheet 17. The solar cell 19 supplies electrical energy when irradiated by light 21, such as sunlight. The electrical energy is removed from the solar cell 19 using a conductor foil 23, conventionally in the form of a copper foil, forming a conductor pattern. A first side of the conductor foil 23 electrically contacts a back surface of the solar cell 19, and a second side of the conductor foil 23 is connected to the connecting device 13. The connecting device 13 is fastened to a back surface of the protective sheet 17, for example, with an adhesive 26. Solar cell energy is guided out from the connecting device 13 to a consumer (not shown) using connection lines 25.

Figure 2:
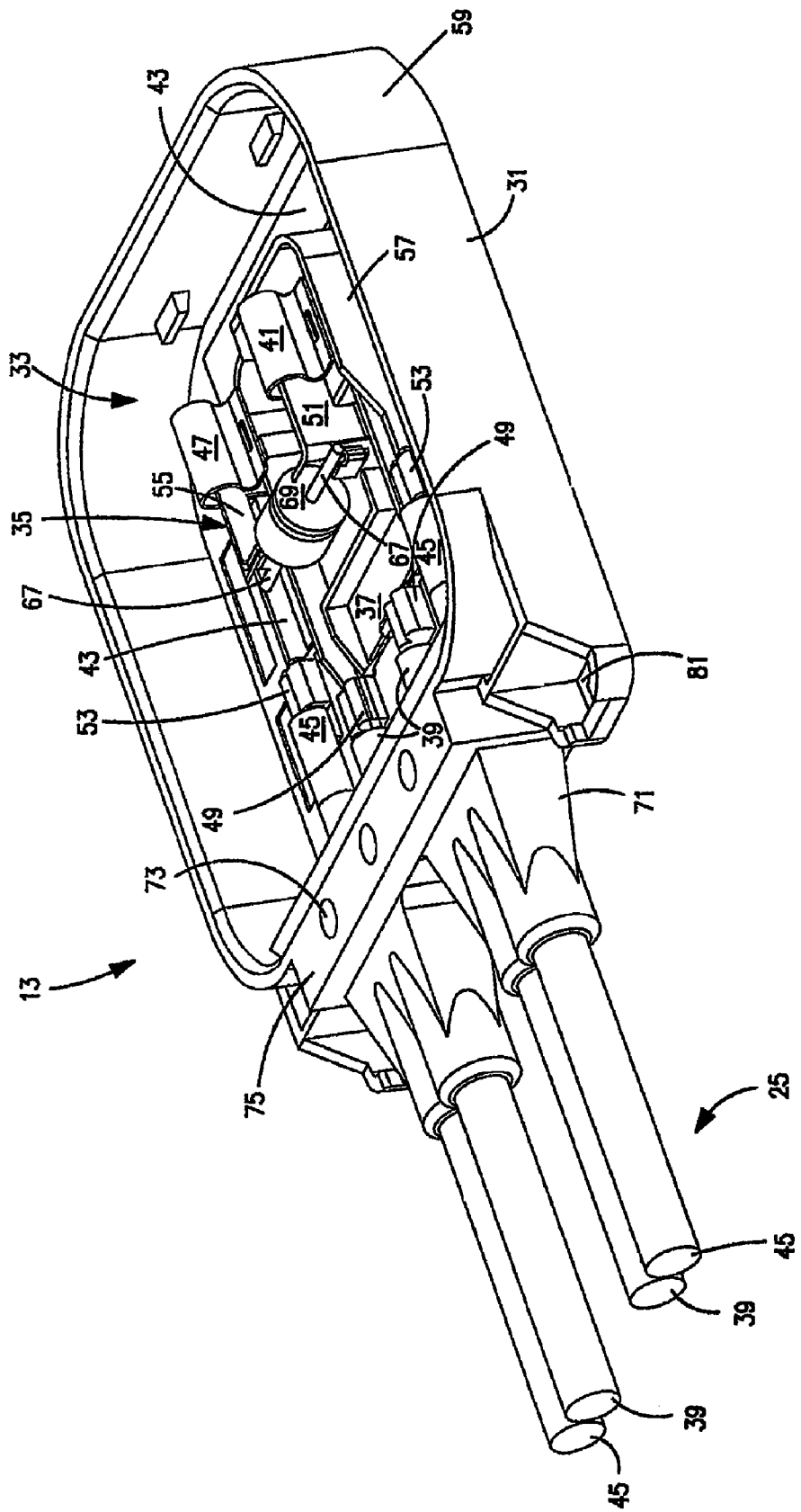
FIG. 2 is a perspective view of a first embodiment of a connecting device according to the invention.
Figure 3:
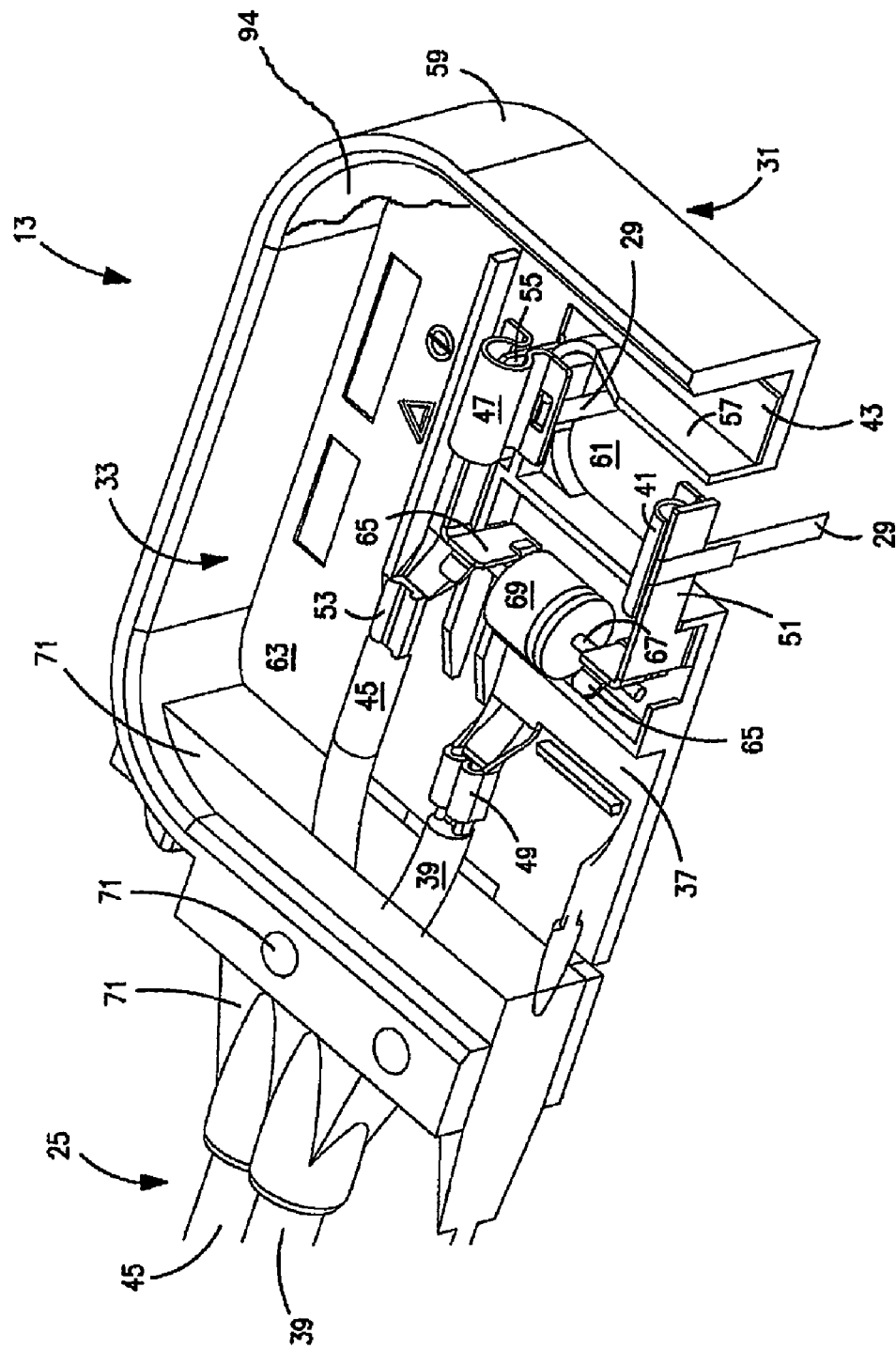
FIG. 3 is a perspective view, partially in cross-section, of the connecting device of FIG. 2.
Figure 4:
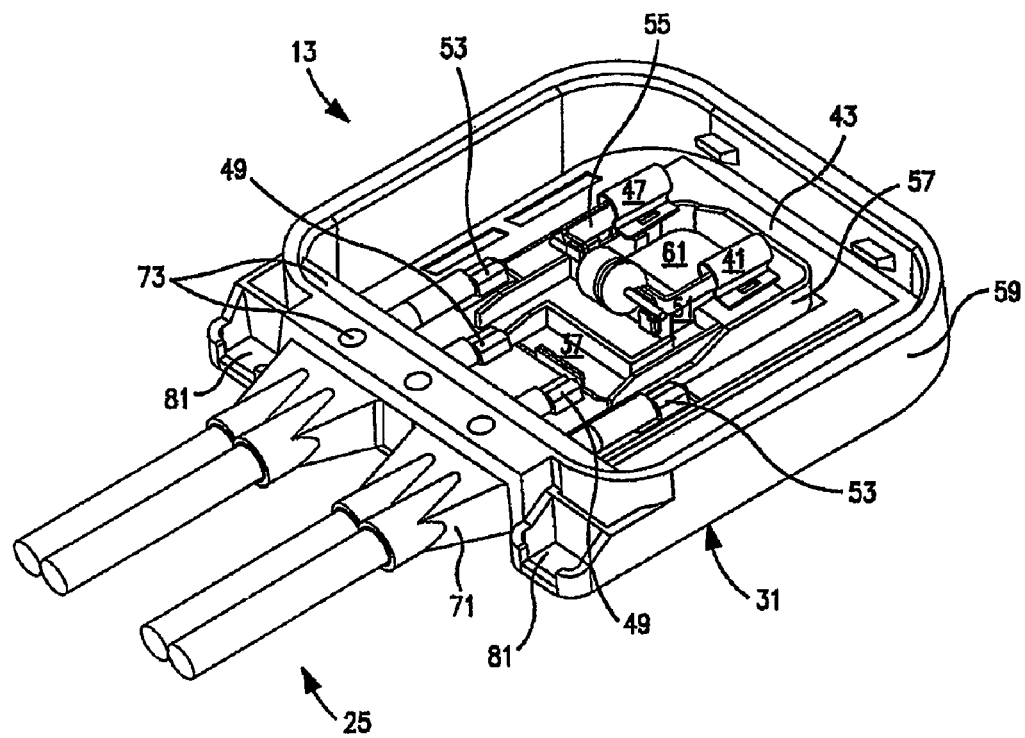
FIG. 4 is a perspective view, partially in cross-section, showing a pressed screen of the connecting device of FIG. 2.

A first embodiment of the connecting device 13 according to the invention will now be described in greater detail with reference to FIGS. 2-5. As shown in FIG. 2, the connecting device 13 comprises a connector housing 31 made, for example, from a conventional plastic material. The connector housing 31 has an interior 33 provided with a multipart pressed screen 35, which serves as an intermediate connecting arrangement. The pressed screen 35 is configured for connection to connection lines 25 and foil conductors 29, as shown in FIG. 3. The connection lines 25 consist of inner and outer connection lines 39 and 45. The foil conductors 29 are, for example, clamped to the pressed screen 35. The foil conductors 29 are connected to solar cell contacts having different potentials.

The pressed screen 35 is provided with first and second pressed screen members 37, 43, respectively, which are isolated from each other in terms of potential. A base 63 of the connector housing 31 may be provided with locking devices (not shown) for securing the first and second pressed screen members 37, 43 to the connector housing 31. Each of the first and second pressed screen members 37, 43 is provided with a terminal clamp 65. A connection wire 67 of a diode 69 is received in each of the terminal clamps 65. The diode 69 prevents compensatory currents between solar cells located in sunlight and solar cells located in shade, which supply different solar currents and solar voltages. The first pressed screen member 37 connects the inner connection lines 39 with the foil conductor 29 via a first clamping spring 41, as shown in FIG. 2. The first pressed screen member 37 connects the inner connection lines 39 with the first clamping spring 41 through first crimped connections 49 crimped to the inner connection lines 39 and a first connection web 51 onto which the first clamping spring 41 may be clamped. The second pressed screen member 43 connects the outer connection lines 45 with the foil conductor 29 via a second clamping spring 47. The second pressed screen member 43 connects the outer connection lines 45 with the second clamping spring 47 through second crimped connections 53 crimped to the outer connection lines 45 and a second connection web 55 onto which the second clamping spring 47 may be clamped.

The first and second connection webs 51, 55 are bent upward from the first and second pressed screen members 39, 43, respectively, such that the first and second connection webs 51, 55 extend substantially perpendicular to the first and second pressed screen members 39, 43, as shown in FIGS. 2-3. As shown in FIG. 3, each of the foil conductors 29 are guided through a foil conductor through-hole 61 in a base 63 of the connector housing 31 and wound around either the first or second connection web 51, 55 so the foil conductors 29 may be clamped in an electrically contacting manner to the first or second connection web 51, 55 using the first or second clamping spring 41, 47.

A partition 57 extends between the first and second pressed screen members 37, 43. The partition 57 may be formed, for example, from the same insulating material as the connector housing 31. The partition 57 may be formed in one piece with the connector housing 31, as shown in FIG. 2. The first pressed screen member 37 is located within the partition 57 and the second pressed screen member 43 is located between the partition 57 and an outer wall 59 of the connector housing 31.

As shown in FIGS. 2-3, the connection lines 25 are guided through one or more connection line through-holes (not shown) of the connector housing 31. The connection lines 25 are sheathed in a region of the connection line through-holes (not shown) with a sealing material 71 to prevent infiltration of moisture through the connection line through-holes (not shown) into the interior 33 of the connector housing 31. In order to sheath the connection lines 25 with the sealing material 71, once the connection lines 25 have been guided through at least one of the connection line through-holes (not shown) into the interior 33 of the connector housing 31, the connector housing 31 is, for example, introduced into an injection mold. The connection lines 25 are sheathed therein with the sealing material 71 in such a way that the sealing material 71 not only surrounds the connection lines 25, but is also provided in securing openings 73 in a side wall 75 of the connector housing 31 adjacent to the connection lines 25 and on an inside of the side wall 75. Ends of the connection lines 25 that are connected to the first and second crimped connections 49, 53 are thus secured to the connector housing 31 in a particularly reliable manner.

In solar battery cell-related applications, outer casings of the connection lines 25 are often made from a crosslinked plastic material that is particularly resistant to the effects of light and weather and conventionally has a relatively smooth outer surface. In order to reduce the risk of the connection lines 25 sliding within the sealing material 71, an agent that reduces the smoothness of the outer surface of the connection lines 25 may be applied to each of the connection lines 25 or around each pair of inner and outer connection lines 39, 45. For example, conventional commercial cable ties (not shown) may be around each of the connection lines 25 or around each pair of inner and outer connection lines 39, 45 and secured thereto. The cable ties (not shown) thereby secure the connection lines in the sealing material 71. The cable ties (not shown) also provide strain relief for the connecting lines 25.

After the connections between the connection lines 25 and the foil conductors 29 have been produced and the sealing material 71 has been applied, the interior 33 of the connector housing 31 may be filled with a filler 94. The filler 94 may be an embedding compound comprising, for example, thermoplastic elastomer (TPE) or ethylene propylene diene monomer (EPDM).

Figure 5:
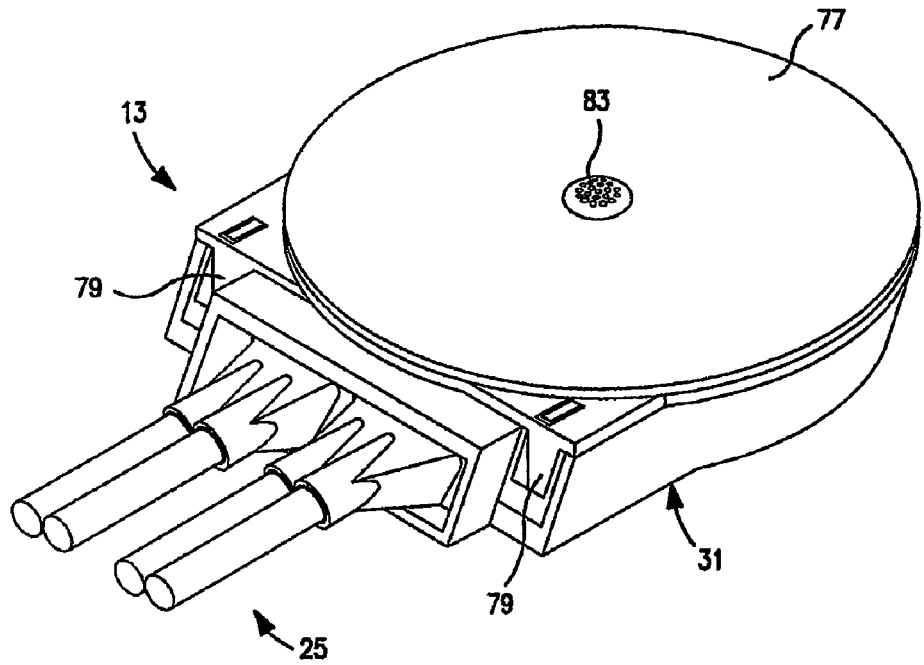
FIG. 5 is a perspective view of the connecting device of FIG. 2 shown with a cover.

As shown in FIG. 5, a lid 77 is provided on the connector housing 31. The lid 77 may be provided, for example, with locking tabs 79 corresponding to locking openings 81 on the connector housing 31. The lid 77 includes a ventilation grate 83 arranged substantially in a center thereof. The ventilation grate 83 is formed to allow pressure compensation if the internal pressure within the connector housing 31 differs from the atmospheric pressure, such as may occur in the event of temperature variation. A microporous, water-tight, air-permeable membrane (not shown) may be arranged on an inside of the ventilation grate 83 to prevent liquid, for example, rainwater, from entering the interior 33 of the connector housing 31 through the ventilation grate 83. Additionally, excess pressure that builds up in the interior 33 of the connector housing 31 may be reduced by allowing air to escape outwardly from the interior 33 of the connector housing 31 through the membrane (not shown). The membrane (not shown), may be formed, for example, from expanded polytetrafluoroethylene (ePTFE), available under the name GORE-TEX® from W.L. Gore and Associates GmbH in Putzbrunn, Germany.

The method of assembling the connecting device 13 will now be explained. The ends of the connection lines 25, which have been stripped, are guided through the at least one connection line through-hole (not shown) in the connector housing 31. The connection lines 25 are, for example, drawn through the connection line through-hole (not shown) sufficiently far enough that the free ends protrude beyond a side wall of the connector housing 31 that opposes the side wall 75. The pressed screen 35 is then crimped, prior to the isolation thereof, into the first and second pressed screen members 37, 43. The first and second crimped connections 49, 53 are crimped to the stripped ends of the connection lines 25. The connection lines 25 are then withdrawn sufficiently far that the pressed screen 35 enters the interior 33 of the connector housing 31, where it is fixed as a result of being locked to the locking elements (not shown) located in the connector housing 31. The pressed screen 35 is then broken down into the first and second pressed screen members 37, 43, if this has not already taken place.

The connector housing 31 is then inserted, together with the first and second pressed screen members 37, 43 and the connection lines 25 connected thereto, into an injection mold (not shown). The sealing material 71 is injected around the connection lines 25 and onto the side walls 75 of the connector housing 31. The foil conductors 29, which are to be connected to the connection lines 25, are threaded through the foil conductor through-hole 61 in the base 63 of the connector housing 31 into the interior 33 of the connector housing 31. The free ends of the foil conductors 29 are wound around the first and second connection webs 51, 55, as shown in FIG. 3. The free ends of the foil conductors 29 are then clamped by attachment of the first and second clamping spring 4, 47, to each of the first and second connection webs 51, 55, respectively to produce an electrical connection between the foil conductors 29 and the associated connection lines 25.

The filler 94 is then introduced into the interior 33 of the connector housing 31. The lid 31 is then positioned on the connector housing 31 to close the connector housing 31. In order to improve the seal between the connector housing 31 and the lid 77, a seal may be formed beforehand in a peripheral recess at an upper end of the connector housing 31 and opposing the housing base 63.

The connecting device 13 is then fastened to the back surface of the protective sheet 17, as shown in FIG. 1. Because the connecting device 13 is fastened to the back surface of the protective sheet 17, the connecting device 13 or a number of the connecting devices 13 may be arranged at almost any locations along the back surface of the solar module.

In the connecting device 13 according to the first embodiment of the invention, the first and second pressed screen members 37, 43 are each configured in such a way that the first and second pressed screen members 37, 43 connect the first and second connection webs 51, 55, to the inner connection lines 39 or the outer connection lines 45. The connecting device 13 according to the first embodiment of the invention may be used for producing a connection in parallel of a plurality of solar cells, should addition of the output currents of a plurality of solar cells be desired.

A second embodiment of the connecting device 13 according to the invention will now be described in greater detail with reference to FIG. 6. The connecting device 13 according to the second embodiment of the invention may be used for producing a connection in series of a plurality of solar cells, should addition of the individual voltages of the solar cells connected in series be desired. In the connecting device 13 according to the second embodiment, the first and second pressed screen members 37, 43 are configured such that each of the first and second connection webs 51, 55 is connected to only one of the connection lines 25. In all other respects, the same reference numerals will be used to denote those elements identical to those shown and described in the first embodiment.

Figure 6:
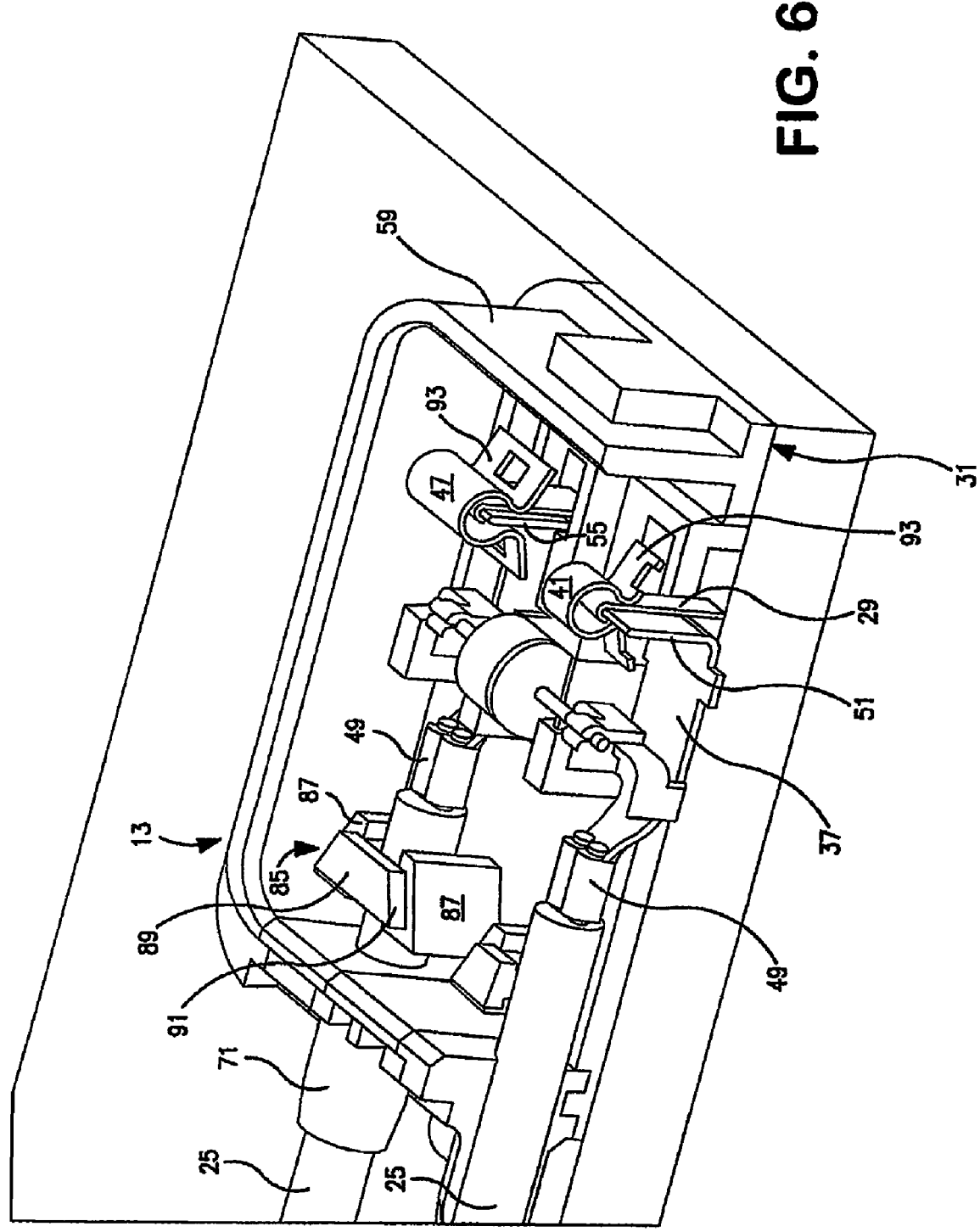
FIG. 6 is a perspective view, partially in cross-section, of a second embodiment of a connecting device according to the invention.

As shown in FIG. 6, the connection lines 25 are each provided with a strain relief member 85 at end regions protruding into the connector housing 31 by which each end of the connection line 25 is clamped. Each of the strain relief members 85 comprises lateral posts 87 extending upward from the base 63 of the connector housing 31 and a bridge 89 extending there between. The lateral posts 87 are arranged on both sides of the connection line 25, and the bridge 89 includes outer arms 91. Insides of the lateral posts 87 and outsides of the outer arms 91 are provided with complementary locking teeth (not shown). The complementary locking teeth (not shown) are configured in such a way that the bridge 89 may be lowered toward the base 63 of the connector housing 31 until each connection line 25 is clamped, but is prevented from moving in an opposite direction thereto. The strain relief member 85 may be provided in addition to or as an alternative to the cable ties (not shown) of the first embodiment.

As shown in FIG. 6, the first and second clamping springs 41, 47 each have a substantially tubular configuration with a substantially C-shaped cross-section leading into a substantially V-shaped cross-section. In other words, at free ends of the C-shaped cross-section of the first and second clamping springs 41, 47 are tabs 93. The tabs 93 protrude from the free ends and facilitate manual handling and machine-automated handling of the first and second clamping springs 41, 47. Either only a single foil conductor 29 is clamped or a plurality of the foil conductors 29 is clamped simultaneously by the first or second clamping spring 41, 47. When a plurality of the foil conductors 29 is clamped, the foil conductors 29 are clamped one above another and/or adjacent to one another. Almost any wiring trees may thus be formed between a large number of solar cells.

The first and second clamping springs 41, 47 have an axial length dependent on the dimensions of the first and second connection webs 51, 55 to which the one or more foil conductors 29 are to be connected. The first and second clamping springs 41, 47 exert clamping pressure on both sides of the first and second connection webs 51, 55 and the foil conductor 29, i.e. the clamping pressure acts symmetrically on a clamping region. In contrast to a clamp that acts on only one side and has to be fastened at some point adjacent to the clamping region to allow an opposing spring force to be absorbed at this location, the first and second clamping springs 41, 47 according to the invention do not need to be mounted at any point outside the clamping region, but rather need simply to be attached to the clamping region with the foil conductor 29 adjacent thereto. The method for mounting the first and second clamping springs 41, 47 may therefore be mechanically automated substantially more easily and using simpler means.

The connecting device 13 according to the first and second embodiments of the invention allows connections to be produced between the foil conductors 29 and the connection lines 25 using means that are cost efficient, technically simple, and require little assembly time. Because the pressed screen 35 can be inserted into the connector housing 31 while still in one piece and then broken down into the first and second pressed screen members 37, 43 after being inserted therein, the pressed screen 35 may be produced comparatively simply (especially in comparison to printed circuit boards), can allow the integration of crimped connections, can easily be locked in the connector housing 31. As the conductor tracks of the printed screen (unlike the conductor tracks of printed circuit boards) may easily be configured three-dimensionally, the conductor tracks may be integrated in a straightforward manner not only with crimped connections, but also with the first and second connection webs 51, 55 having sufficient inherent strength to allow even the first and second clamping springs 41, 47 having relatively high resilience to be attached, thus allowing particularly effective electrical contact between the foil conductors 29 and the first and second pressed screen members 37, 43. A further component, for example, the diode 69, may also be clamped using the pressed screen 35.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A connecting device that connects at least one foil conductor to at least one connection line, comprising:

an insulative connector housing having a pressed screen arranged in an interior thereof, the pressed screen electrically connecting the foil conductor to the connection line; and a first clamping spring configured for resilient attachment to a first connection web extending from the pressed screen, the first connection web extending substantially perpendicular to the pressed screen and the first clamping spring fixing the foil conductor to the first connection web in an electrically conductive manner.

2. The connecting device of claim 1, wherein the connection line is connected to the pressed screen by a first crimped connection.

3. The connecting device of claim 1, wherein the electrical foil conductor is wound around the first connection web.

4. The connecting device of claim 1, further comprising a diode connected to the pressed screen.

5. The connecting device of claim 1, wherein the connection line extends through a side wall of the insulative connector housing and the foil conductor extends through a base of the insulative connector housing.

6. The connecting device of claim 1, wherein the first clamping spring has a substantially C-shaped cross-section.

7. The connecting device of claim 1, wherein the clamping spring is configured to apply pressure on both sides of the first connecting web.

8. The connecting device of claim 1, wherein an interior of the insulative connector housing contains a filler.

9. A connecting device for electrically connecting solar cells of a solar module, comprising:
   an insulative connector housing having a pressed screen arranged in an interior thereof, the pressed screen having a first pressed screen member electrically isolated from a second pressed screen member, each of the first and second pressed screen members electrically connecting a foil conductor to a connection line; and
   at least the first pressed screen member having a first clamping spring configured for resilient attachment to a first connection web extending from the first pressed screen member, the first connection web extending substantially perpendicular to the first pressed screen member and the first clamping spring fixing the foil conductor of the first pressed screen member to the first connection web in an electrically conductive manner.

10. The connecting device of claim 9, wherein the second pressed screen member has a second clamping spring configured for resilient attachment to a second connection web extending from the second pressed screen member, the second clamping spring fixing the foil conductor of the second pressed screen member to the second connection web in an electrically conductive manner.

11. The connecting device of claim 9, wherein the at least the connection line of the first screen member is connected to the first pressed screen by a first crimped connection.

12. The connecting device of claim 9, wherein the electrical foil conductor is wound around the first connection web.

13. The connecting device of claim 9, further comprising a diode connected to the pressed screen.

14. The connecting device of claim 9, wherein the connection lines extend through a side wall of the insulative connector housing and the foil conductors extend through a base of the insulative connector housing.

15. The connecting device of claim 9, wherein the first clamping spring has a substantially C-shaped cross-section.

16. The connecting device of claim 9, wherein the clamping spring is configured to apply pressure on both sides of the first connecting web.

17. The connecting device of claim 9, wherein an interior of the insulative connector housing contains a filler.

* * * * *